(12) United States Patent
Dimpflmaier et al.

(10) Patent No.: US 8,548,475 B2
(45) Date of Patent: Oct. 1, 2013

(54) METHOD FOR OPTIMIZING POWER CONSUMPTION IN WIRELESS DEVICES USING DATA RATE EFFICIENCY FACTOR

(75) Inventors: Ronald W. Dimpflmaier, Los Gatos, CA (US); Jesse Yu, San Jose, CA (US); Nicholas W. Lum, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 13/211,730

(22) Filed: Aug. 17, 2011

(65) Prior Publication Data

US 2013/0045744 A1    Feb. 21, 2013

(51) Int. Cl.
*H04W 36/00* (2009.01)
*H04W 4/00* (2009.01)
*H04M 1/00* (2006.01)

(52) U.S. Cl.
USPC ......... 455/437; 455/436; 455/552.1; 370/332

(58) Field of Classification Search
USPC ........................................................ 455/437
See application file for complete search history.

(56) References Cited

U.S. PATENT DOCUMENTS

| | | | |
|---|---|---|---|
| 6,728,349 B2 | 4/2004 | Chang et al. |
| 6,842,622 B2 | 1/2005 | Peters et al. |
| 7,190,351 B1 | 3/2007 | Goren |
| 7,233,229 B2 | 6/2007 | Stroupe et al. |
| 7,263,351 B2 | 8/2007 | Ross et al. |
| 7,315,614 B2 | 1/2008 | Bedingfield, Sr. et al. |
| 7,362,854 B2 | 4/2008 | McKnight |
| 7,551,586 B1 | 6/2009 | Yew et al. |
| 7,630,724 B2 | 12/2009 | Beyer, Jr. et al. |
| 2001/0029194 A1 | 10/2001 | Ketola et al. |
| 2006/0229107 A1 | 10/2006 | Cho et al. |
| 2007/0253339 A1 | 11/2007 | Ovadia et al. |
| 2008/0039152 A1 | 2/2008 | Arisawa |

(Continued)

FOREIGN PATENT DOCUMENTS

| | | |
|---|---|---|
| EP | 1 071 295 A2 | 1/2001 |
| EP | 2 148 531 A1 | 1/2010 |
| WO | 2009/035243 | 3/2009 |
| WO | 2011075151 | 6/2011 |

OTHER PUBLICATIONS

International Search Report and Written Opinion in EP Application No. PCT/US2012/049182, issued Oct. 31, 2012, pp. 1-10.

(Continued)

*Primary Examiner* — Charles N. Appiah
*Assistant Examiner* — Natasha Cosme
(74) *Attorney, Agent, or Firm* — Meyertons, Hood, Kivlin, Kowert & Goetzel, P.C.

(57) ABSTRACT

An electronic device has wireless communications circuitry that supports communications using multiple radio access technologies. The electronic device may gather information such as data rate values, power consumption values, and other data for a currently active radio access technology and an alternative radio access technology. The electronic device may automatically switch between the currently active radio access technology and the alternative radio access technology based on a value of a data rate efficiency metric. The data rate efficiency metric may represent how efficiently each radio access technology is capable of using power to convey a given amount of data per unit time. The data rate efficiency metric may be evaluated using measured power consumption data, measured data rate values, and operating parameters such as signal strength and transmitted power parameters.

22 Claims, 4 Drawing Sheets

(56) References Cited

U.S. PATENT DOCUMENTS

| | | |
|---|---|---|
| 2008/0049675 A1 | 2/2008 | Burgan et al. |
| 2009/0028179 A1 | 1/2009 | Albal |
| 2009/0175183 A1* | 7/2009 | Mochizuki et al. ........... 370/252 |
| 2010/0178919 A1 | 7/2010 | Deepak et al. |
| 2010/0203904 A1 | 8/2010 | Khokhlov |
| 2011/0051642 A1 | 3/2011 | Krishnaswamy |
| 2011/0055363 A1 | 3/2011 | Kanno et al. |
| 2011/0076989 A1 | 3/2011 | Lynch |
| 2011/0085549 A1 | 4/2011 | DiMambro |
| 2011/0185202 A1 | 7/2011 | Black et al. |
| 2011/0244870 A1* | 10/2011 | Lee ................................ 455/444 |
| 2011/0310982 A1 | 12/2011 | Yang et al. |

OTHER PUBLICATIONS

Evans, Joel; "Review: Samsung Instinct;" geek.com, Jul. 8, 2008, retrieved from <http://www.geek.com/articles/mobile/review-samsung-instinct-2008078/> on Mar. 14, 2013, pp. 1-11.

* cited by examiner

| 3G RSSI | TYPICAL REQUIRED TX POWER | TYPICAL DEPOWER CONSUMPTION OF WIRELESS CIRCUITRY | TYPICAL DATA RATE | DREF |
|---|---|---|---|---|
| -45 dBM | -10 dBM | 1W | 1Mbps | $1\frac{Mbps}{W}$ |
| -50 dBM | -5 dBM | 1.5W | .75Mbps | $0.5\frac{Mbps}{W}$ |
| -55 dBM | 0 dBM | 2W | .5 | $0.25\frac{Mbps}{W}$ |
| | | | | |

METHOD FOR OPTIMIZING POWER CONSUMPTION IN WIRELESS DEVICES USING DATA RATE EFFICIENCY FACTOR

BACKGROUND

This relates generally to wireless communications circuitry, and more particularly, to optimizing power consumption associated with using wireless circuitry in electronic devices.

Electronic devices such as computers and cellular telephones are often provided with wireless communications capabilities. For example, electronic devices may use long-range wireless communications circuitry such as cellular telephone circuitry to handle voice and data traffic.

Wireless networks are often able to support multiple radio access technologies. For example, a wireless network may have legacy equipment for handling radio access technologies associated with "2G" and "3G" communications as well as newer equipment for handling radio-access technologies such as the Long Term Evolution (LTE) radio access technology that are associated with "4G" communications.

In networks with support for multiple radio access technologies, the amount of coverage available for each radio access technology may vary as a function of a user's location and network traffic levels. If a user is located near an edge of a network cell or is operating in an environment in which numerous users are burdening the network, performance may degrade. If care is not taken, performance degradations may cause a user's electronic device to consume power inefficiently when handling wireless data traffic.

It would therefore be desirable to be able to optimize power consumption efficiency in wireless electronic devices such as electronic devices that support communications with multiple radio access technologies.

SUMMARY

A wireless electronic device has wireless communications circuitry that supports communications using multiple radio access technologies. Depending on network conditions, one of the radio access technologies may use power more efficiently in conveying wireless data than another. To optimally consume battery power in the electronic device, the electronic device may switch between use of the multiple radio access technologies.

The electronic device may gather information such as data rate values, power consumption values, and other operating values for a currently active radio access technology and an alternative radio access technology. The electronic device may automatically switch between the currently active radio access technology and the alternative radio access technology based on a value of a data rate efficiency metric. The data rate efficiency metric may represent how efficiently each radio access technology is capable of using power to convey a given amount of data per unit time (i.e., how much data can be conveyed per unit of energy). The data rate efficiency metric may be evaluated using measured power consumption data, measured data rate values, and operating parameters such as signal strength and transmitted power parameters.

Further features of the invention, its nature and various advantages will be more apparent from the accompanying drawings and the following detailed description of the preferred embodiments.

BRIEF DESCRIPTION OF THE DRAWINGS

FIG. 2 is an illustrative look-up table of the type that may be used to determine the value of a data rate efficiency factor (DREF) based on a signal strength parameter and other wireless parameters in accordance with an embodiment of the present invention.

DETAILED DESCRIPTION

Figure 1:
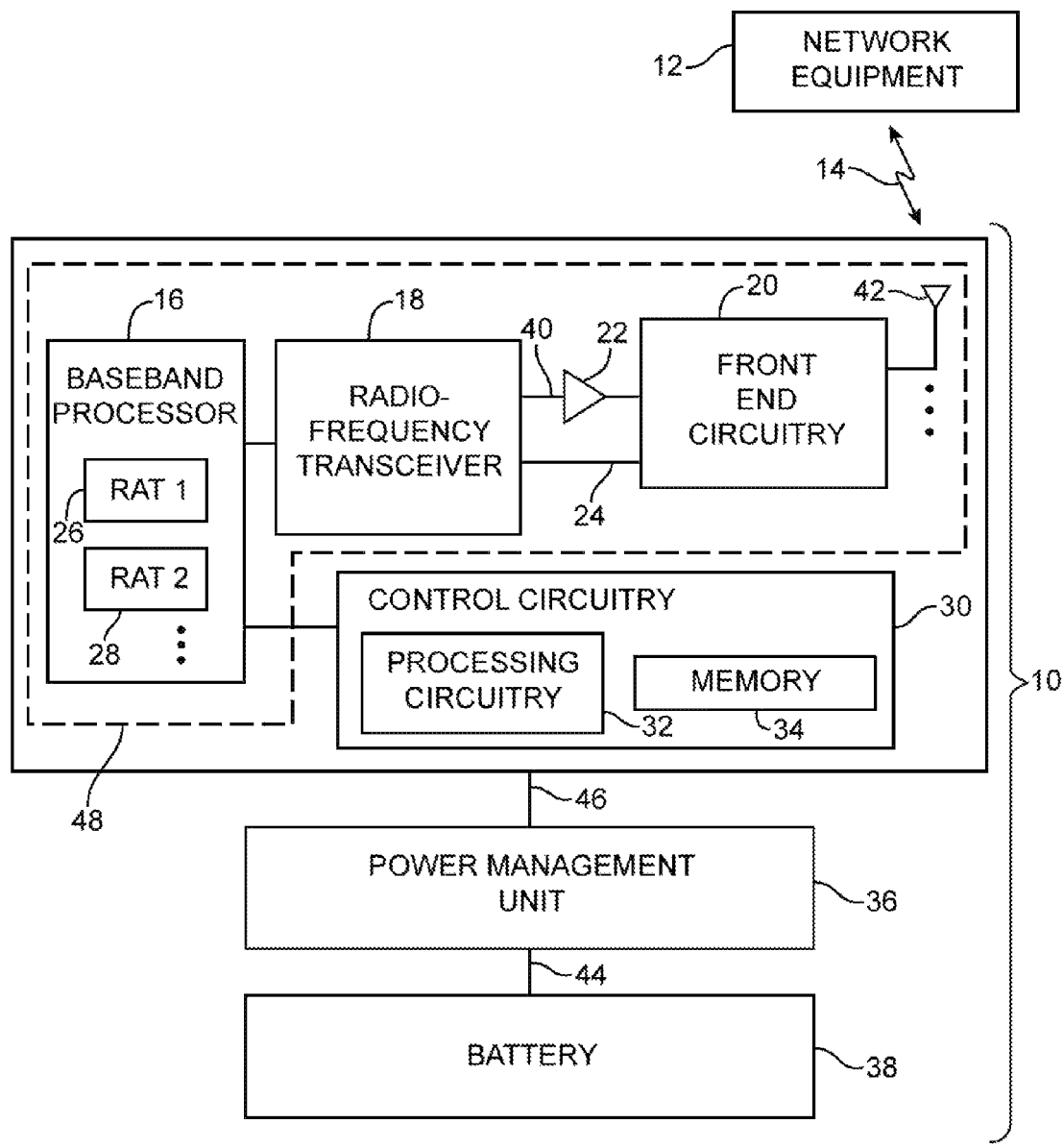
FIG. 1 is a schematic diagram of an illustrative electronic device with wireless communications circuitry in accordance with an embodiment of the present invention.

Modern wireless networks often support multiple radio access technologies. Examples of radio access technologies include Global System for Mobile Communications (GSM), Universal Mobile Telecommunications System (UMTS), Code Division Multiple Access (CDMA) (e.g., CDMA2000 including standards such as CDMA2000 1XRTT), and Long Term Evolution (LTE). The radio access technologies that were introduced earliest such as GSM, UMTS, and CDMA are sometimes referred to as 2G or 3G technologies and the more recently introduced and potentially more advanced technologies such as LTE are sometimes referred to as 4G technologies. Radio access technologies such as these may be used by wireless networks such as cellular telephone network in communicating with cellular telephones, portable computers, and other user equipment. Many networks support both legacy radio access technologies (e.g., 2G and/or 3G radio access technologies) while simultaneously deploying newer (e.g., 4G technologies). This technique of supporting multiple radio access technologies allows equipment that is capable of supporting newer radio access technologies benefit from the potential advances offered by the newer radio access technologies without disrupting service for users with legacy equipment.

Although offering good data throughput under satisfactory operating conditions, newer radio access technologies such as 4G radio access technologies cannot guarantee high data rates in marginal network environments. A user may therefore not always experience high data rates, even when connected to a network using a newer radio access technology such as a 4G radio access technology. In some situations, this can lead to undesirably large amounts of power consumption.

As an example, consider a user with a cellular telephone or other electronic device that is uploading a data file to a wireless network using a 4G radio access technology. In optimal network conditions, where the user is able to obtain good signal strength from the network and where the number of simultaneous users of the network is low, a user might be able to obtain an upload data rate of 60 Mbps. In obtaining this upload data rate, the wireless circuitry in the user's electronic device may consume 3 W of power in the electronic device. In suboptimal network conditions, such as when a user is trying to upload the file at a location at the edge of a cell boundary where signal strength is weak or when there are numerous simultaneous users burdening the network, the user might only be able to obtain an upload data rate of 60 kbps. Even though the wireless circuitry in the user's electronic device is only transmitting data at 60 kbps (in this example), the wireless circuitry in the electronic device may require the same 3 W of power as when the user's device is transmitting data at 60 Mbps. The relatively large amount of power consumption (3 W in this example) that can be associated with both low and high 4G data rates, arises because there is often a fairly extensive amount of required internal device processing associated with implementing newer 4G technology relative to legacy 2G and 3G technologies.

As this example demonstrates, the amount of data that is transferred for a given expenditure of battery energy under optimal network conditions (60 Mbps/3 W=20 Mb/J) can be significantly larger than the amount of data that is transferred for the same expenditure of battery energy under suboptimal network conditions (60 kbps/3 W=20 kb/J).

An electronic device that can be used to address this potential inefficiency is shown in FIG. 1. As shown in FIG. 1, electronic device 10 may communicate with network equipment 12 over wireless communications path 14. Network equipment 12 may support multiple radio access technologies (RATs) such as Global System for Mobile Communications (GSM), Universal Mobile Telecommunications System (UMTS), Code Division Multiple Access (CDMA) (e.g., CDMA2000 including standards such as CDMA2000 1XRTT), Long Term Evolution (LTE), WiFi® (IEEE 802.11), WiMax (IEEE 802.16), and other radio access technologies. Radio access technologies such as GSM, UMTS, and CDMA, which are sometimes referred to as 2G or 3G technologies, 4G radio access technologies such as LTE, and additional radio access technologies such as WiFi and WiMax may sometimes be supported in the same network.

To avoid using power inefficiently during wireless operations, electronic device 10 can determine how efficiently data is being transferred using its currently active radio access technology and can compare its efficiency level to that of available alternative radio access technologies. This allows device 10 to use an optimal radio access technology.

Real time power consumption measurements and data rate measurements can be used to determine how efficiently data is being transferred or a data transfer efficiency value may be estimated from signal strength parameters and other operating parameters. For comparison, device 10 can also determine how efficiently data might be transferred if an alternative radio access technology were to be used. Device 10 may, as an example, compute the value of a data rate efficiency metric (sometimes referred to as a data rate efficiency factor or DREF) for both a current and an alternate radio access technology. By comparing the value of DREF for the current and alternate radio access technology, device 10 can decide whether or not it would be beneficial to switch from the current to the alternate radio access technology to improve power consumption efficiency.

Consider, as an example, a scenario in which 4G performance is suboptimal due to heavy network congestion and poor signal coverage at the edge of a network cell. A user might, under these conditions, be able to transfer data at 50 kbps while expending 3 W of power using a 4G radio access technology. If, however, the user were to switch to a 3G radio access technology, the user might be able to achieve a 1 Mbps data transfer rate while expending 1.5 W of power. Because the 3G data transfer conditions (for this example) offer the possibility of more efficient data transfer (more transferred data per unit expended energy), device 10 can switch from a 4G to a 3 G operating mode to optimize power consumption. This change in radio access technology may be performed automatically in real time, without requiring intervention by the user of the electronic device or may be performed after obtaining a confirmation from the user.

Device 10 may have control circuitry such as baseband processor 16 and control circuitry 30. The control circuitry in device 10 may be configured to evaluate a data rate power efficiency metric such as data rate power efficiency factor DREF in real time for both the current and alternate radio access technology. The value of DREF may be used in determining when to switch between radio access technologies.

Baseband processor 16 may include protocol stacks for handing multiple radio access technologies. For example, baseband processor 16 may include a first protocol stack such as protocol stack 26 for handling wireless data communications with a first radio access technology (RAT1), a second protocol stack such as protocol stack 28 for handling wireless data communications with a second radio access technology (RAT2), etc. Device 10 can switch between use of protocol stacks 26 and 28 during operation based on the value of DREF for current and alternate radio access technologies, so that data is continually conveyed with optimal efficiency.

Control circuitry 30 may include processing circuitry 32 and memory 34. Processing circuitry 30 may include one or more microprocessors, one or more microcontrollers, one or more digital signal processors, one or more application specific integrated circuits, and/or other suitable processing and control circuitry. Memory 34 may include stand-alone memory chips, hard drives, storage circuitry that is included in one or more other integrated circuits, and other storage.

During data transmission operations, data from circuitry such as processor circuitry 32 may be provided to radio-frequency transceiver 18 via baseband processor 16. Radio-frequency transceiver circuitry 18 may include a transmitter that transmits radio-frequency signals on path 40. Power amplifier circuitry such as power amplifier circuitry 22 may be used in amplifying transmitted radio-frequency signals. Transmitted signals from the output of power amplifier circuitry 22 may be coupled to one or more antennas (antenna structures) such as antenna 42 by front-end circuitry 20. Front-end circuitry 20 may include radio-frequency filters such as duplexers and diplexers, impedance matching circuitry, transmission line circuitry, switching circuitry, and other circuitry for coupling transceiver circuitry 18 to antenna structures 42. During data reception operations, received antenna signals from antenna 42 may be provided to a receiver in radio-frequency transceiver circuitry 18 via front-end circuitry 20 and path 24. Paths such a path 24 may, if desired, include a low noise amplifier (LNA) for amplifying received radio-frequency signals.

Power for powering device 10 may be obtained from a wired source such a wall outlet and an alternating current (AC) to direct current (DC) power converter or from a battery such as battery 38. Particularly in portable devices, it may be desirable to use batteries such as battery 38 to provide a source of power. As shown in FIG. 1, battery 38 may provide DC power to power management unit 36 via a path such as path 44. Power management unit 36 may help regulate the flow of power to wireless circuitry 48 (including the control circuitry in baseband processor 16) and control circuitry 30.

During operation of device 10, power management unit 36 may be used to measure the amount of power that is being consumed. Path 46 may contain signal paths that allow control circuitry such as control circuitry 30 and/or control circuitry in baseband processor 16 to communicate with control circuitry in power management unit 36. For example, path 46 may be used to convey information from power management unit 36 to control circuitry in device 10 such as control circuitry 30 and/or control circuitry in baseband processor 16 that indicates how much power is currently being drawn from battery 38. During wireless operation, wireless circuitry 48 consumes the majority of power in device 10, so the power consumption data that is provided by power management unit 36 corresponds to the power consumption level associated with wireless circuitry 48. Power management unit 36 may make power measurements by measuring the amount of current (I) that is being delivered to the circuitry of device 10 such as wireless circuitry 48, by measuring the voltage (V) associated with the delivered current, and by computing consumed power P using equation (1).

$$P = V * I \quad (1)$$

Other techniques for measuring the power that is being consumed by device 10 (wireless circuitry 48) may be used if desired. The use of circuitry such as power management unit circuitry 36 of FIG. 1 is merely illustrative.

The value of DREF (i.e., the ratio of data rate to the amount of power consumed) for various radio access technologies can be determined by ascertaining a data rate value, ascertaining a power consumption value, and computing the ratio of the data rate value to the power consumption value. Measured values of power and/or data rate and/or estimated values of power and/or data rate may be used.

For example, the amount of data that is currently being transmitted or received by device 10 per unit time may be determined by querying baseband processor 16 or other wireless circuitry that is being used to transmit and receive data. In some circumstances (e.g., when determining the data rate that will be associated with use of an alternative radio access technology before actually using the alternative radio access technology to handle data traffic), it may not be possible to sample the actual data rate. In this type of situation, it may be desirable to compute the data rate value using a data rate estimation function. The function may be implemented as a mathematical expression or a look-up table and may be used to relate operating parameters such as signal strength and other wireless parameters to associated data rates.

Power consumption values can be measured in real time using power measurement circuitry in device 10 such as power management unit 36 or may be estimated. As an example, the power draw of wireless circuitry 48 for a given radio access technology may be estimated by gathering data on operating parameters that influence power consumption levels. Examples of operating parameters that may be used in computing (estimating) power consumption for wireless circuitry 48 include the identity of the radio access technology involved, information on which radio-frequency signal modulation scheme is being used or is to be used in conveying wireless data with the given radio access technology, information on the quality of communications link 14 (e.g., signal strength information for the given radio access technology), information on which integrated circuits in wireless circuitry 48 are being powered, information on the amount of power amplifier circuitry 22 that is being used and/or power amplifier settings for power amplifier 18 (e.g., transmit power data), information on settings associated with front-end circuitry 20 and antenna structures 42, etc. Device operating parameters (e.g., wireless circuitry operating parameters) such as these may be used in estimating the amount of power consumption that is associated with a currently active radio access technology and/or the amount of power consumption that will be associated with use of a given radio access technology (i.e., an alternate radio access technology).

Using direct measurements and/or calculations to estimate data values, device 10 (e.g., control circuitry such as control circuitry 30 and/or control circuitry in baseband processor 16) may be used in determining the values of data efficiency parameter (metric) DREF. An illustrative look-up table of the type that may be used in computing DREF as a function of a wireless parameters such as RSSI (received signal strength indicator) for a radio access technology such as a 3G radio access technology is shown in FIG. 2. The value of measured RSSI is shown in the first column of the table of FIG. 2. The value of RSSI for a given radio access technology (e.g., a currently active radio access technology) may be obtained from baseband processor integrated circuit 16 during operation of wireless circuitry 48 (as an example). As shown in FIG. 2, lower values of RSSI (indicative of weaker signal strength and therefore a greater need to boost transmit powers as shown in the second column) may be associated with larger expected transmit (TX) power levels and correspondingly larger power consumption for wireless circuitry 48 (as shown in the third column). The expected values of data rate tend to increase for larger signal strengths and decrease for lower signal strengths, as shown in the fourth column of the table of FIG. 2. The value of DREF (the fourth column entry in each row divided by the third column entry in that row) is shown in the entries of the fifth column of the table of FIG. 2. (To conserve storage space, intermediate columns such as the second, third, and fourth columns of FIG. 2 may be omitted in practice.)

If desired, other parameters may be used in determining the value of DREF. Examples of other parameters that may be used in evaluating DREF include received signal code power (RSCP), reference signal received power (RSRP), modulation and coding scheme (MCS), channel quality indicator (CQI), rank indication (RI), precoding matrix indicator (PMI), signal to interference plus noise ratio (SINR), transmit (Tx) power level, etc. Parameters such as these may be gathered by wireless circuitry 48 (e.g., baseband processor 16). In general, operating parameters in device 10 may be gathered using any suitable circuitry in device 10 (e.g., power management unit 36, control circuitry 30, baseband processor 16, etc.). These parameters may be evaluated to compute DREF using a function implemented using a look-up table such as the table of FIG. 2 or using a mathematical expression (e.g., a function that takes one or more of these parameters as an input and that produces a DREF value as an output).

Using an approach of the type shown in the example of FIG. 2, device 10 may determine the value of DREF for a radio access technology such as the currently active radio access technology (i.e., for the currently active data traffic that is being handled by transceiver 18 and that is being carried over path 14). Device 10 can also use a look-up table of the type shown in FIG. 2 or a mathematical expression to compute the expected value of DREF if device 10 were to switch to using an alternative radio access technology to handle the wireless traffic for device 10. As an example, if device 10 is currently carrying 4G traffic, device 10 can determine the value of DREF for both the current 4G radio access technology and an alternative 3G radio access technology.

In determining the value of DREF for the alternative radio access technology, device 10 may temporarily use the alternative radio access technology. For example, device 10 may switch to use of an alternative protocol stack during a period of time in which the currently active radio access technology is idle, may use a secondary antenna in antenna structures 42 to evaluate the amount of performance currently available using the alternative radio access technology, etc. In making these evaluations, device 10 may obtain values for parameters such as the wireless parameters and other operating parameters described in connection with FIG. 2 (e.g., RSSI, RSCP, RSRP, MCS, CQI, RI, PMI, SINR, Tx power level, current data rate, etc.). The function that device 10 uses to compute expected data rate and power consumption (i.e., DREF) may be implemented using a look-up table of the type shown in FIG. 2, a mathematical expression, a combination of one or more tables and one or more expressions, etc.

Figure 3:
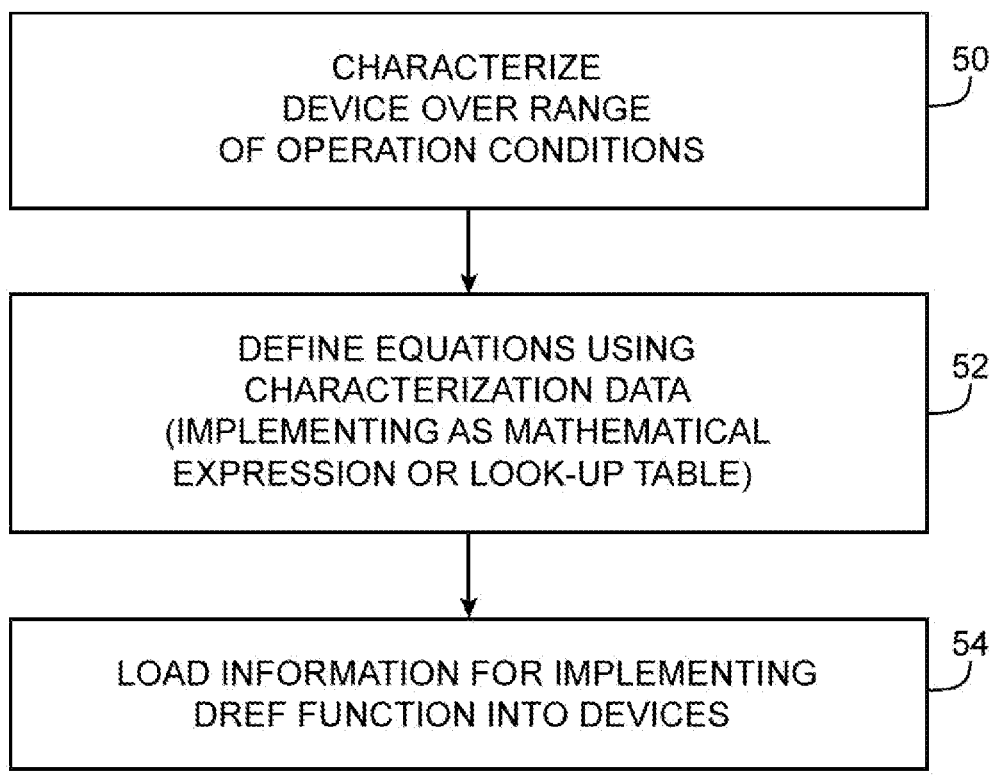
FIG. 3 is a flow chart of illustrative steps involved in characterizing wireless electronic device performance and loading data rate efficiency information into wireless devices during manufacturing in accordance with an embodiment of the present invention.

A flow chart of operations involved in characterizing and setting up devices such as device 10 of FIG. 1 is shown in FIG. 3. At step 50, the data rate power efficiency performance of device 10 may be characterized. In particular, data may be gathered on the performance of device 10 under a variety of data rate and power consumption conditions. For example, power consumption for device 10 can be measured as a function of which radio access technology is being used, which data rate is being used, various wireless parameter values (e.g., RSSI, etc.), and other operating and wireless parameters. This data may be used in computing a DREF function for each radio access technology (step 52). In particular, the operations of step 52 may be used to complete the entries in a table of the type shown in FIG. 2 and/or may be used to determine the values of the constants and other relationships used in forming a mathematical expression for the DREF function. DREF characterization data such as look-up table data and/or mathematical expression data that describes a DREF function for each radio access technology may be loaded into device 10 during the operations of step 54. Device 10 may then be shipped to a user and used in a wireless network.

Figure 4:
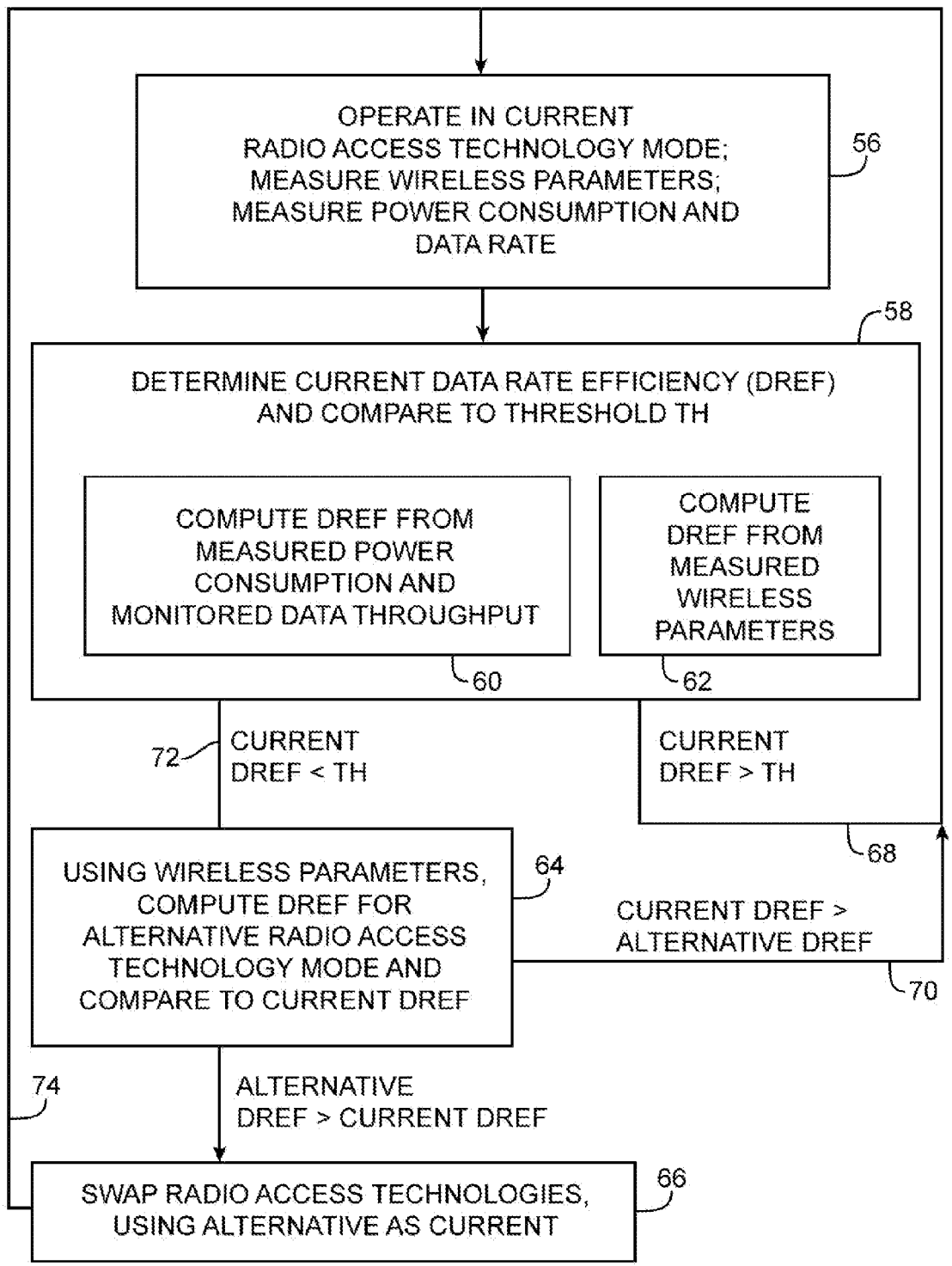
FIG. 4 is a flow chart of illustrative steps of operating a wireless electronic device to optimize power consumption in accordance with an embodiment of the present invention.

FIG. 4 is a flow chart of illustrative steps involved in operating device 10 in a wireless network that includes network equipment 12 (i.e., when carrying data over communications link 14).

At step 56, device 10 may operate in a mode in which a current radio access technology is being used to communicate data over link 14. The current radio access technology mode may be, for example, a 3G radio access technology mode such as a UMTS mode or may be a 4G radio access technology mode such as an LTE mode (as illustrative examples). While operating in the current radio access technology mode, device 10 may gather information on operating parameters for device 10 that can be used in evaluating data rate power efficiency metric DREF. These parameters may include the value of current power consumption by wireless circuitry 48 (e.g., a power consumption value obtained by control circuitry in device 10 from power management unit 36), information on wireless parameters such as RSSI, RSCP, RSRP, MCS, CQI, RI, PMI, SINR, Tx power level, current data rate, etc. that is gathered from baseband processor 16 or other circuitry in device 10, etc.).

At step 58, the data that was gathered at step 56 may be used in determining the current value of DREF. The value of DREF may be computed from the measured value of power consumption (e.g., a current power consumption measurement from power management unit 36) and the current known data rate (e.g., a current data rate value obtained from baseband processor 16), as shown by step 60. If desired, DREF may be computed (i.e., estimated) at step 62 from the operating parameters gathered during the operations of step 56. For example, a function of the type described in connection with FIG. 2 may be used to estimate DREF for the currently active radio access technology as a function of measured parameters values such as measured values of RSSI (as an example). Other operating parameters may be used in estimating DREF if desired (e.g., wireless parameters other than RSSI, Tx power, etc.).

After the current value of DREF has been determined, the current value of DREF (i.e., the value of DREF corresponding to the current radio access technology) may be compared a predetermined threshold value TH. The value of TH may be configured so that DREF values of more than TH are indicative of satisfactory data rate power efficiency performance (i.e., a satisfactory amount of data is being transmitted per unit of expended battery energy).

In response to a determination at step 58 that the value of current DREF is greater than TH, processing may loop back to step 56, as indicated by line 68.

In response to a determination at step 58 that the value of current DREF is less than TH, processing may proceed to step 64, as indicated by line 72.

During the operations of step 64, device 10 (e.g., the control circuitry in device 10) may determine the value of DREF for one or more alternative radio access technologies. For example, a function implemented using a look-up table of the type described in connection with FIG. 2 or a mathematical expression may be used to compute DREF for an alternative radio access technology. In computing the alternative DREF value, device 10 may gather information on additional operating parameters and/or may use information from the operating parameters gathered during step 56. For example, device 10 may use RSSI values from baseband processor 16 that are gathered during the operation of baseband processor 16 (e.g., RSSI values corresponding to signals associated with the alternative radio access technology), device 10 may use other wireless parameters associated with the alternative radio access technology, device 10 may use data rate information associated with the alternative data rate technology, and may use measured and/or estimated power consumption information to determine the value of DREF for the alternative radio access technology.

During the operations of step 64, device 10 may compare the values of current DREF (DREF for the current radio access technology) and alternative DREF (DREF for using the alternative radio access technology). The behavior of device 10 after comparing the values of current DREF and alternative DREF depends on whether current DREF is larger than alternative DREF or whether alternative DREF is larger than current DREF.

If the value of current DREF is larger than the value of alternative DREF, device 10 can conclude that it would not further optimize power consumption in device 10 to switch to use of the alternative radio access technology. The data rate for conveying data across path 14 might be larger or smaller using the alternative radio access technology, but the ratio of the data rate divided by the power consumption of device 10 would not improve if device 10 were to switch to use of the alternative radio access technology. Accordingly, in response to determining that current DREF value is greater than the alternative DREF value at step 64 (i.e., in response to determining that alternative DREF is less than current DREF), the currently active radio access technology can be maintained as the currently active radio access technology and processing can loop back to the operations of step 56, as indicated by line 70.

If, however, the current DREF value is smaller than the alternative DREF value, device 10 can conclude that it would be beneficial to switch from the current radio access technology to the alternative radio access technology, as this would help optimize power consumption in device 10. The data rate for conveying data across path 14 might (or might not) be different using the alternative radio access technology. Regardless of expected changes in data rate, the ratio of the expected data rate for using the alternative radio access technology divided by the expected power consumption of device 10 using the alternative radio access technology is anticipated to improve from the current ratio of data rate to power consumption. It is therefore expected that data will be conveyed more efficiently using the alternative radio access technology than using the current radio access technology. Accordingly, in response to determining that current DREF value is less than the alternative DREF value at step 64 (i.e., in response to determining that alternative DREF is greater than current DREF), processing can proceed to the operations of step 66.

During the operations of step 66, device 10 may swap its currently active radio access technology and the alternative radio access technology (i.e., the alternative radio access technology can be switched into active use in place of the current radio access technology). In this way, the radio access technology that was previously considered as an available alternative may be switched into active use to become the current radio access technology. Processing can then loop back to the operations of step 56, as indicated by line 74.

Operations of the type shown in FIG. 4 may be performed continuously, as a user moves device 10 to different locations within a wireless network and as network usage varies throughout the day (e.g., as the number of active users in the network increases and decreases). When network conditions arise that allow a first radio access technology to exhibit an ability to transfer more data per unit energy than a second radio access technology, control circuitry in device 10 may use the protocol stack for the first radio access technology to handle wireless traffic with the wireless network. When, however, network conditions change sufficiently that a second radio access technology exhibits a superior ability to transfer data efficiently per unit energy, device 10 can switch the second radio access technology into use in place of the first radio access technology and can use the protocol stack for the second wireless access technology to handle wireless traffic with the wireless network.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating a wireless electronic device that supports multiple radio access technologies, comprising:
   determining a data rate efficiency value associated with a currently active radio access technology in the wireless electronic device, wherein the data rate efficiency value associated with the currently active radio access technology is based on a ratio of a data rate for the currently active radio access technology to a power consumption value for the currently active radio access technology;
   determining a data rate efficiency value associated with an alternative radio access technology in the wireless electronic device, wherein the data rate efficiency value associated with the alternative active radio access technology is based on a ratio of a data rate for the alternative active radio access technology to a power consumption value for the alternative active radio access technology; and
   in response to determining that the data rate efficiency value for the alternative radio access technology is greater than the data rate efficiency value for the current radio access technology, switching the alternate radio access technology into use in conveying wireless data for the wireless electronic device in place of the currently active radio access technology.

2. The method defined in claim 1 further comprising:
   in response to determining that the data rate efficiency value for the alternative radio access technology is less than the data rate efficiency value for the current radio access technology, maintaining use of the currently active radio access technology as the currently active radio access technology in the wireless electronic device.

3. The method defined in claim 1 wherein determining the data rate efficiency value associated with the currently active radio access technology comprises:
   with control circuitry in the wireless electronic device, computing a ratio of a current data rate associated with conveying wireless data traffic with the wireless electronic device divided by a current power consumption value.

4. The method defined in claim 3 wherein determining the data rate efficiency value associated with the alternative radio access technology comprises computing a ratio of a data rate associated with conveying wireless data traffic with the wireless electronic device using the alternative radio access technology divided by a power consumption value.

5. The method defined in claim 1 wherein determining the data rate efficiency value for the currently active radio access technology comprises making a power consumption measurement using a power management unit in the wireless electronic device.

6. The method defined in claim 1 wherein determining the data rate efficiency value for the currently active radio access technology comprises determining a current wireless traffic data rate using a baseband processor in the wireless electronic device.

7. The method defined in claim 1 wherein determining the data rate efficiency value for the currently active radio access technology comprises obtaining a wireless parameter associated with the currently active radio access technology from a baseband processor.

8. The method defined in claim 1 wherein determining the data rate efficiency value for the currently active radio access technology comprises obtaining an operating parameter for the wireless electronic device that is associated with the currently active radio access technology from a baseband processor, wherein the operating parameter is selected from the group consisting of: RSSI, RSCP, RSRP, MCS, CQI, RI, PMI, SINR, and transmit power level.

9. The method defined in claim 1 wherein determining the data rate efficiency value for the currently active radio access technology comprises:
   with control circuitry in the wireless electronic device, using a mathematical expression to compute a value for a current wireless data rate associated with the wireless electronic device divided by a current power consumption associated with the wireless electronic device based at least partly on data from a baseband processor in the wireless electronic device.

10. The method defined in claim 1 wherein determining the data rate efficiency value for the alternative radio access technology comprises using a lookup table to estimate a value for a wireless data rate associated with using the alternative radio access technology to wirelessly transmit data divided by a power consumption associated with the wireless electronic device.

11. The method defined in claim 1 wherein the currently active radio access technology comprises a Long Term Evolution (LTE) radio access technology.

12. A wireless electronic device, comprising:
   wireless circuitry that is configured to transmit and receive radio-frequency signals using multiple radio access technologies; and
   control circuitry that is coupled to the wireless circuitry, wherein the control circuitry is configured to select which of the multiple radio access technologies to use in real time based at least partly on a data rate efficiency metric, wherein the data rate efficiency metric is based on a ratio of a data rate value for wirelessly conveying data traffic with the wireless electronic device divided by a power consumption value associated with using the wireless electronic device to wirelessly convey the data traffic.

13. The wireless electronic device defined in claim 12 wherein the control circuitry is configured to determine a first value for the data rate efficiency metric for a currently active one of the multiple radio access technologies and is configured to determine a second value for the data rate efficiency metric for an alternative one of the multiple radio access technologies.

14. The wireless electronic device defined in claim 13 wherein the control circuitry is configured to switch the alternative one of the multiple radio access technologies into use in place of the currently active one of the multiple radio access technologies in response to determining that the first value is less than the second value.

15. The wireless electronic device defined in claim 14 wherein the wireless circuitry and the control circuitry are configured to compute at least one of the first value and the second value based on a parameter selected from the group consisting of: RSSI, RSCP, RSRP, MCS, CQI, RI, PMI, SINR, and transmit power level.

16. The wireless electronic device defined in claim 14 wherein the wireless circuitry and control circuitry are configured to compute at least one of the first value and the second value based on received wireless signal strength information.

17. A method of operating a wireless electronic device that supports wireless communications using multiple radio access technologies including a currently active radio access technology and an alternative radio access technology, comprising:
based on a value of a data rate efficiency metric, using control circuitry within the wireless electronic device to determine whether to maintain use of the currently active radio access technology in conveying wireless data or whether to switch the alternative radio access technology into use in place of the currently active radio access technology, wherein the data rate efficiency metric is based at least partly on a ratio of a data rate value for wirelessly conveying data traffic with the wireless electronic device divided by a power consumption value associated with using the wireless electronic device to wirelessly convey the data traffic.

18. The method defined claim 17 further comprising:
with the control circuitry, obtaining the data rate value from a baseband processor integrated circuit in the wireless electronic device.

19. The method defined in claim 18 further comprising:
measuring the power consumption value using a power management unit in the wireless electronic device.

20. The method defined in claim 17 wherein at least one of the multiple radio access technologies comprises a Long Term Evolution (LTE) radio access technology, wherein the currently active radio access technology comprises the LTE radio access technology, and wherein using the control circuitry within the wireless electronic device to determine whether to maintain use of the currently active radio access technology in conveying wireless data or whether to switch the alternative radio access technology into use in place of the currently active radio access technology comprises using the control circuitry within the wireless electronic device to determine whether to maintain use of the LTE radio access technology in conveying wireless data or whether to switch the alternative radio access technology into use in place of the LTE radio access technology.

21. A non-transitory, computer accessible memory medium storing program instructions for operating a wireless electronic device that supports multiple radio access technologies, wherein the program instructions are executable to:
determine a data rate efficiency value associated with a currently active radio access technology in the wireless electronic device, wherein the data rate efficiency value associated with the currently active radio access technology is based on a ratio of a data rate for the currently active radio access technology to a power consumption value for the currently active radio access technology;
determine a data rate efficiency value associated with an alternative radio access technology in the wireless electronic device, wherein the data rate efficiency value associated with the alternative active radio access technology is based on a ratio of a data rate for the alternative active radio access technology to a power consumption value for the alternative active radio access technology; and
in response to determining that the data rate efficiency value for the alternative radio access technology is greater than the data rate efficiency value for the current radio access technology, switch the alternate radio access technology into use in conveying wireless data for the wireless electronic device in place of the currently active radio access technology.

22. The non-transitory, computer accessible memory medium defined in claim 21, wherein determining the data rate efficiency value for the currently active radio access technology comprises obtaining an operating parameter for the wireless electronic device that is associated with the currently active radio access technology from a baseband processor, wherein the operating parameter is selected from the group consisting of: RSSI, RSCP, RSRP, MCS, CQI, RI, PMI, SINR, and transmit power level.

* * * * *